Figure 1:
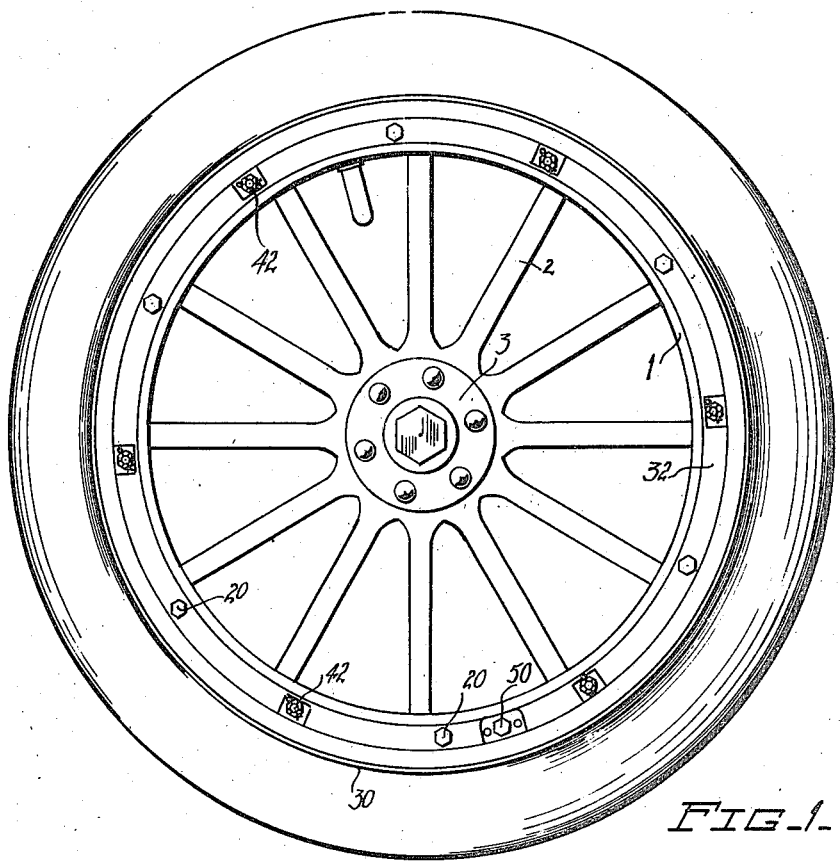

C. E. F. AHLM.
DEMOUNTABLE RIM.
APPLICATION FILED FEB. 8, 1917.

1,301,352.

Patented Apr. 22, 1919.
2 SHEETS—SHEET 1.

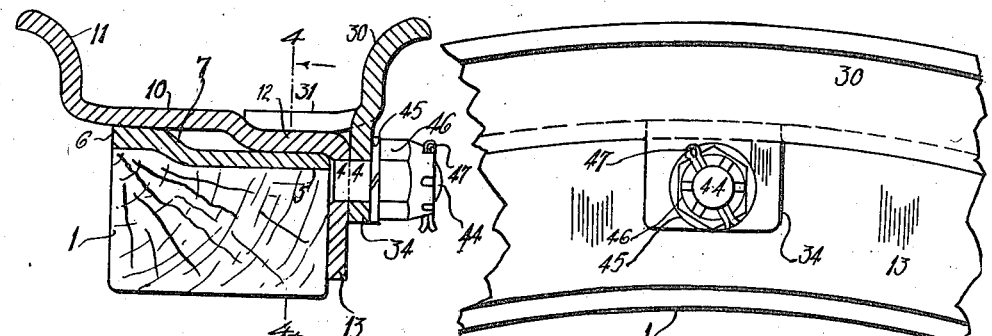
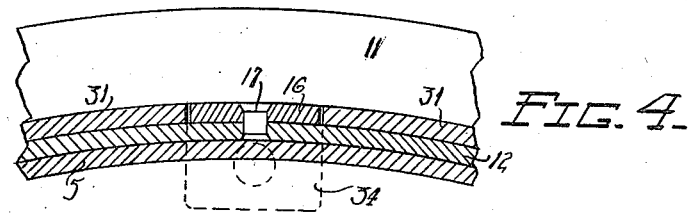

UNITED STATES PATENT OFFICE.

CHARLES E. F. AHLM, OF CLEVELAND, OHIO, ASSIGNOR TO WILLIAM A. NERACHER, OF WARREN, OHIO, AND ALFRED FRITZSCHE, OF CLEVELAND, OHIO.

DEMOUNTABLE RIM.

1,301,352.  Specification of Letters Patent.  Patented Apr. 22, 1919.

Application filed February 8, 1917. Serial No. 147,412.

*To all whom it may concern:*

Be it known that I, CHARLES E. F. AHLM, a citizen of the United States, residing at Cleveland, in the county of Cuyahoga and State of Ohio, have invented a certain new and useful Improvement in Demountable Rims, of which the following is a full, clear, and exact description, reference being had to the accompanying drawings.

This invention relates to demountable rims adapted to carry pneumatic tires for use on automobiles and in similar places. A number of forms of tire-carrying rims which are demountable from the wheel center have been devised and are in use, but those with which I am familiar involve many difficulties in the placing of the tire on the demounted rim, or in removing a tire therefrom. For example, considerable skill, as well as manual force, is ordinarily required in mounting the tire on the rim. In such operation it is usually necessary to pry the tire casing over the edge of the rim to a greater or less extent, and not infrequently the prying tools slip, resulting in a puncture of the inner tube. Sometimes the rim pinches the tube between the casing and rim; sometimes the inflating nipple of the tube is forced askew by the rim, frequently causing a break in the inner tube. When removing a tire considerable troublesome prying is also required, and it is sometimes found that the rusting of the tire casing to the rim seriously interferes with the entry and operation of the prying tools.

The object of my invention is to provide a simple and effective rim, which, while being readily demountable from the wheel, may also be demounted or separated from the tire, quickly, easily and safely, and without the use of special tools. A more specific object of the invention is to provide the feature of ready separability from the tire in a rim which has a flange extending radially inward and adapted to abut the side of the wheel felly.

As far as making the rim demountable from the wheel is concerned, it has been found satisfactory to provide the felly band with a substantially cylindrical external enlargement or step adjacent to its inner edge, and provide the inner face of the rim with a step near its outer edge, each of such steps resting on the plain cylindrical portion of the other member of the combination, and to provide the rim with an inwardly extending radial flange by which it may be locked to the wheel center, by bolts which extend through the radial flange and felly. Such a demountable rim is shown and claimed in Patent No. 1,083,321, issued Jan. 6, 1914, to "Captain" Motor Wheel Company, Limited, of Bristol, England, as assignee of A. F. Gunstone. It is an object of my invention to improve the Gunstone or "Captain" rim, endowing it with the feature of ready separability from the tire.

In accomplishing the objects above referred to, I form the rim of two separable parts which are rigidly connected together in operation. One of these parts comprises the main body of the rim and is adapted to lie on the outer periphery of the felly, and has at one edge an outward tire-engaging flange. The other part comprises the other tire-engaging flange and one or more portions which lie against the first part and are removably secured thereto. One or both of the parts has an inward radial flange adapted to extend over the outer side of the felly, and be bolted to it.

When my rim is demounted from the wheel, the removal of the separate tire-flange enables the tire to be slid into place easily and rapidly and secured by replacing the flange. When the flange has been replaced and secured to the main body of the rim, the rim is complete and the tire and rim may be mounted on the wheel, as set out in the Gunstone patent and as hereinafter explained, or may be carried indefinitely as a "spare" ready for mounting whenever desired.

Figure 2:
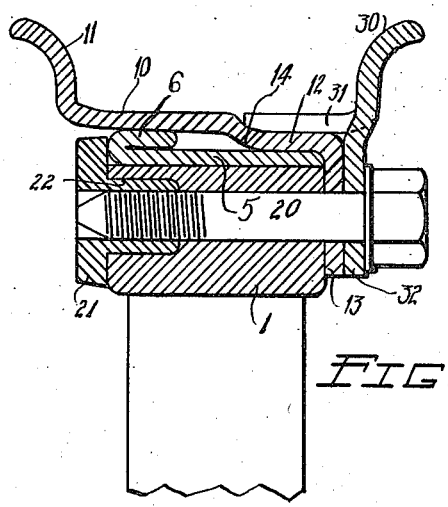

In the drawings, Figure 1 is a side elevation of my improved rim in place on a wheel and carrying a pneumatic tire of the usual form; Fig. 2 is a radial section through one form of my separable rim when in place on a wheel, this section being taken through one of the bolts which secures the rim to the wheel; Fig. 3 is a cross section of the rim in place, the section being taken through one of the bolts which secures the removable flange to the rim, this view showing a modified form of step on the felly band; Fig. 4 is a sectional detail of the rim shown in Fig. 3, being sectioned on a plane indicated by the line 4—4 on Fig. 3; Fig. 5 is a partial side elevation of the rim. In each of the views the rim shown is of the straight side type, but it is to be understood that the invention is equally applicable to a clencher type of rim if desired.

As shown in the drawings, 1 indicates the felly of a wheel carried by the usual spokes 2 and hub 3. On the outer periphery of this felly is a felly band 5 which is shown as cylindrical for the most part but having near the inner edge a step or external enlarged portion 6. This enlarged portion is substantially cylindrical on its outer face and may be made by turning a zone of the band near the inner edge over onto the outer face of the band, as shown in Fig. 2. Or the band may be offset outwardly near its inner edge, such offset or stepped portion connecting with the portion 5 by a gradual conical portion 7, as appears in Fig. 3. In the latter case the felly itself has a corresponding step or enlargement to support the outwardly offset portion of the felly band. In each case the original stock, from which the stepped band is made, may conveniently be of substantially the same thickness of metal throughout.

The main body of the rim is designated 10. It consists of a cylindrical portion, from one edge of which extends outwardly the tire-holding flange 11. Adjacent to the other edge this cylindrical portion 10 is offset inwardly to provide a stepped portion 12 having a substantially cylindrical inner and outer periphery. This stepped portion at its other edge is turned inwardly to produce a radial flange 13. The stepped portion 12 joins the main body 10 by a substantially conical portion 14. This main rim member is preferably one single integral piece of metal of substantially the same thickness throughout, and may readily be made by rolling.

The inner periphery of the portion 10 of the main body of the rim is of such diameter as to make a snug sliding fit with the step 6 of the felly band. Similarly the inwardly stepped portion 12 of the rim makes a snug sliding fit with the main cylindrical body 5 of the felly band. This enables the rim to be snugly mounted on the felly band, as shown. When so mounted the flange 13 of the rim abuts the inner face of the felly. In placing such a rim as described on the wheel center, the valve nipple from the inner tube is first passed through a radial hole (somewhat larger than the exterior of the nipple) in the felly band and felly, with the rim tipped slightly out of the plane of the wheel, and then the rim is swung a short distance about the valve nipple portion as a center, causing the rim to move into place on the felly band.

The surface of the steps on the felly band and on the rim may be slightly curved to enable such parts to move over the corresponding cylindrical portions of the coöperating members in this swinging movement into place, and finally to take a firm seat. However, in such movement there is no binding until the cylindrical rim portion comes over the felly step 6 or the rim-step 12 comes over the felly band portion 5, and after engagement at these points the arc through which the rim swings is so short as to be equivalent for practical purposes to a straight movement.

When the rim is once in place on the felly band it is supported at the step of the felly band and the inward step of the rim and is clamped tightly in place by bolts 20 which pass through the radial flange 13 into nuts 21, which preferably are formed with sleeve portions extending into the felly, as shown at 22 in Fig. 2.

To make such a demountable rim as described readily separable from the tire, I provide the tire-engaging flange 30 of a separate piece of metal suitably secured to the main body of the rim. This flange 30 is of the same shape as the flange 11. Both of these flanges are shown in the drawings as of the straight side type, though they may be of clencher form or of other shape, if desired. I will now describe the means for securing the separable tire flange 30 to the main body of the rim.

The flange 30 is provided with an inward substantially cylindrical portion 31 which seats on the outer periphery of the rim step 12, but portions of this rim 31 are cut out and turned downwardly to provide integral straps 34 which lie alongside of the flange 13 of the main rim. These straps are suitably secured to the flange 13. For this purpose I have shown bolts 44 countersunk in the flange 13 extending through the straps 34 and provided with spring washers 45, castellated nuts 46, and cotter pins 47. If desired the notches in the cylindrical flange 31, where the straps are turned outwardly, may be filled by blocks 16 (Fig. 4), approximately the size of the notches, secured to the rim step 12 at proper points, as by rivets 17. Such blocks will serve also as guides in assembling the rim.

Such a rim as just described is secured to the wheel by means of the bolts 20 and nuts 21, as already described. When removed from the wheel the rim may be separated by removing the nuts 46 and taking off the flange 30, which allows the tire to be replaced and removed as before.

It should be noticed that the cylindrical portion comes across the inner periphery of the tire bead at that side and thus counteracts any tendency of the tire to tip the flange out of place. This inwardly extending cylindrical portion, together with the securing means, cause the removable flange, when the rim is in use, to be as rigidly held to the body of the rim as if the rim were not separable. It should be noticed also that when demounted from the wheel the rim retains its complete form until intentionally separated and is thus well adapted for carrying the tire as a "spare".

When it is desired to place the tire on the rim or remove it therefrom, the separable flange is disconnected, and the tire is slid into place or moved from the rim, as the case may be. It is accordingly a matter of extreme ease to either put the tire in place on the rim or remove it from it. When it is in place the return of the separate flange and the securing of it to the rest of the rim is readily accomplished and completes the operation.

My rim may be made to fit the felly band with considerable snugness, the bolts 20 being employed to draw the rim into final position. For convenience in removing the rim a backing-off bolt (50, Fig. 1), is provided on the opposite side of the rim from this hole for the valve nipple. This bolt is threaded in the radial flange or flanges and bears against a metal plate set into the side of the felly, and may shove the rim off a fraction of an inch—enough to loosen its hold.

The ease of removal of the rim from the wheel may be increased by making the co-acting surfaces on the felly band and rim very slightly conical (tapering toward a distant point on the outer side of the wheel) instead of absolutely cylindrical, and such slight coning, as well as a slight rounding which may be given to these surfaces, is intended to be included in the term "substantially cylindrical", as used herein.

Having thus described my invention, what I claim is:

1. In a structure of the character described, the combination of a separable rim comprising a body portion having a part adapted to seat around a wheel felly, a tire engaging flange at one edge and an inwardly extending flange at the other adapted to abut the side of the felly, and a separable part carrying the other tire flange and having a substantially cylindrical flange overlying the body part, portions of said cylindrical flange being cut out and bent to lie alongside of the said inward flange of the body portion, and means for securing together said inward flange and said cut out portions.

2. The combination of a rim member having an intermediate portion, a tire engaging flange at one edge thereof and a radial inwardly extending flange at the other edge, said intermediate portion being offset outwardly between the flanges, whereby the portion adjacent to the radial flange may engage an unstepped portion of the felly band and the portion adjacent to the tire flange may engage a stepped portion of the felly band, a removable rim holding member comprising a tire engaging flange, an integral portion thereof extending substantially cylindrically and resting against the unstepped part of the intermediate portion of the other member, there being cut out portions of the said cylindrical flange which are turned inward radially and lie along the outer side of the radial flange of the other member, and bolts having their heads countersunk in the radial flange of the main body member, said bolts extending parallel with the wheel axis through the inwardly turned portions of the other rim member, and nuts on said bolts.

In testimony whereof, I hereunto affix my signature.

CHARLES E. F. AHLM.